H. C. STRUCHEN.
BRAKE FOR TRUCKS AND SIMILAR VEHICLES.
APPLICATION FILED SEPT. 17, 1917.
1,353,862.
Patented Sept. 28, 1920.
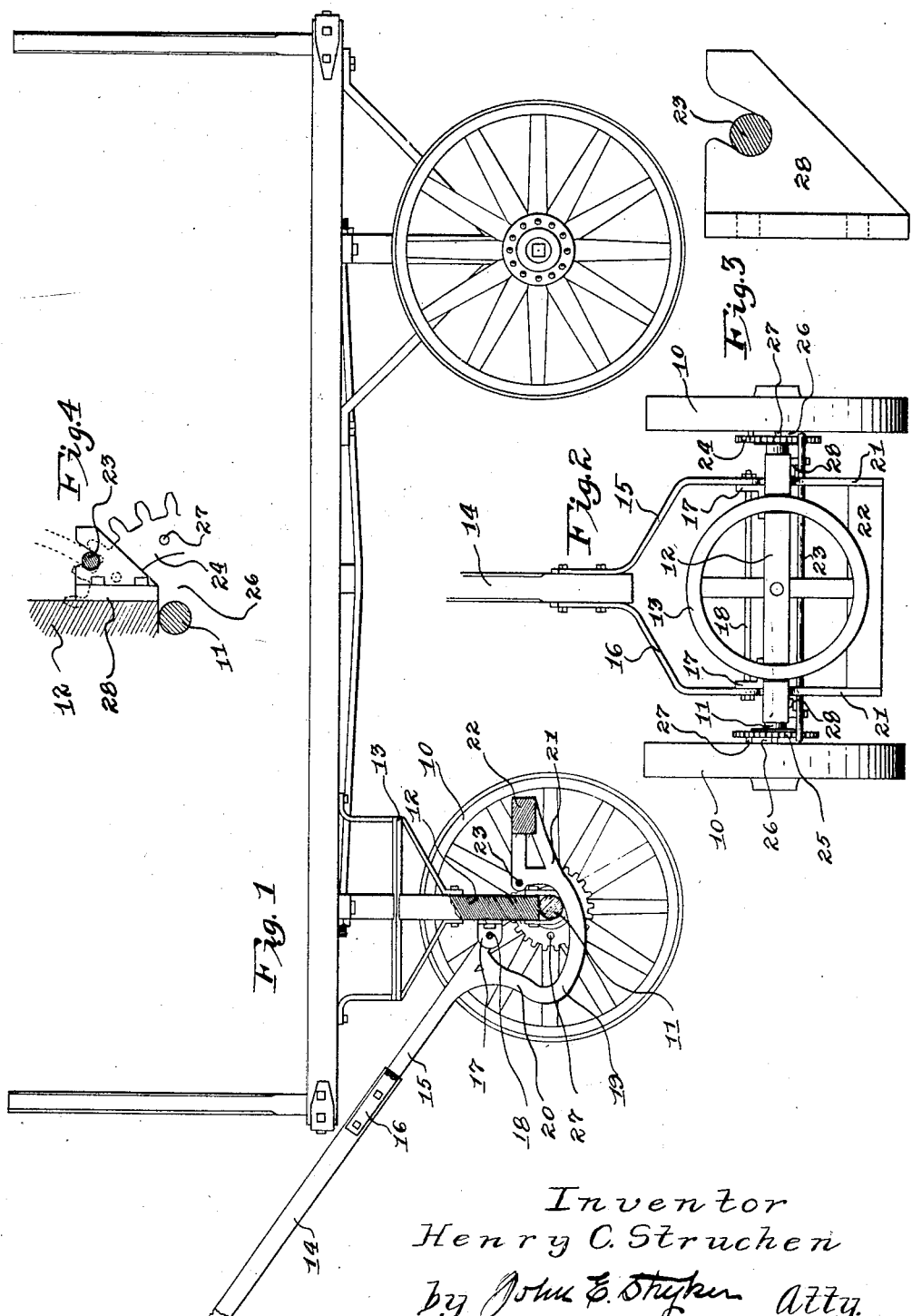
Inventor
Henry C. Struchen
by John E. Stryker Atty.

UNITED STATES PATENT OFFICE.

HENRY C. STRUCHEN, OF ST. PAUL, MINNESOTA.

BRAKE FOR TRUCKS AND SIMILAR VEHICLES.

1,353,862. Specification of Letters Patent. Patented Sept. 28, 1920.

Application filed September 17, 1917. Serial No. 191,755.

*To all whom it may concern:*

Be it known that I, HENRY C. STRUCHEN, a citizen of the United States, residing at St. Paul, in the county of Ramsey and State of Minnesota, have invented new and useful Improvements in Brakes for Trucks and Similar Vehicles, of which the following is a specification.

Its object is to provide a brake for baggage and warehouse trucks which may be applied automatically by gravity immediately upon the release of the truck tongue by a workman.

Generally my mechanism consists of a counterweight carried by arms extending rearwardly of the pivotal point of the tongue and a transverse bar carried by said arms and adapted to engage an annular clutch mounted upon the hubs of the forward wheels when the tongue is released by the attendant and raised through the medium of the counterweight.

More specifically my invention is illustrated in the accompanying drawings, in which Figure 1 is a side elevation of a truck equipped with my brake, one front wheel being cut away to more clearly show my novel mechanism; Fig. 2 is a top plan of the front carriage shown in Fig. 1 detached from the truck by removing the kingbolt; Fig. 3 represents a bracket adapted to receive the brake rod, and Fig. 4 is a diagrammatic view of the bracket as shown in Fig. 3, the brake rod, and the clutch gear and illustrates the path traversed by the brake bar as the tongue is lowered.

In the drawings, I have used the numeral 10 to represent the front wheels of a truck. Said wheels are journaled upon an axle 11 permanently secured to a bolster 12, upon the top of which is mounted a so-called fifth-wheel 13. The tongue 14 has the usual Y-straps 15 and 16 bolted thereto and said straps are hinged to the bolster 12 by passing a bolt 18 through alined bores in said Y-straps and the L-shaped hinge-members 17, which are bolted to said bolster.

The foregoing paragraph describes a construction common to many trucks, and my improvement consists generally in extending the Y-straps 15 and 16 downwardly and rearwardly to form curved arms 19, which carry upon projections 21 back of the bolster 12, a counterweight 22 and detent or brake rod 23 adapted to co-act with gears 24, 25 on the front wheels 10. While the design of such arms 19 is susceptible of considerable modification, the essential features are that the downwardly extending portions 20 of the arms shall be so placed with reference to the pivot 18 that their lower extremities will not strike the axle 11 or bolster 12 when the tongue is lowered and thereby obstruct its downward movement. The rearward extending portions 21 of such arms are preferably curved to correspond to an arc struck from the center of the pivot or hinge 18 and with a radius equal to the distance from such pivot 18 to the lower circumference of the axle 11. This construction permits the arms 21 to oscillate under and behind the axle. The counterweight 22 is sufficiently heavy to lift the tongue when the tongue is released by the person propelling the truck. Immediately behind the bolster 12 and parallel to the axle 11, I rigidly fasten the brake rod or detent 23 in the arms 21. Said brake rod 23 projects beyond the arms 21 and terminates close to the inner sides of the spokes of the wheels 10 (Fig. 2). The clutch gears 24 and 25 are arranged snugly about the inner extremities of the hubs 26 of the wheels 10, and are secured to the spokes of the wheels by bolts 27. When the tongue 14 is free to be lifted by the counterweight 22, the detent 23 is drawn into engagement with the gears 24 and 25 and locks the wheels 10 against rotation. Brackets 28 may advantageously be bolted to the rear side of the bolster 12 into which the rod 23 drops when the tongue is lifted and such brackets relieve the arms supporting the rod and counterweight from strains arising from jars and shocks to the truck when the brake is set. Fig. 3 shows such a bracket, and Fig. 4 illustrates diagrammatically the brake rod in engagement with the clutch gear and bracket, and further shows a construction of gear which may be satisfactorily employed in my device.

Having described my invention, what I claim as new and desire to protect by Letters Patent is:

A brake for trucks, comprising a tongue hinged adjacent to a truck axle, oscillatory arms carried by said tongue and extending behind said axle, gears rigidly secured to the front wheels of said truck, a detent mounted on said arms and adapted to be held out of engagement with said gears by said tongue, means to raise said tongue and thereby engage said gears and detent, and brackets secured to said truck and adapted to support said detent when said detent is in engagement with said gears.

Whereof I have hereunto subscribed my name to this specification.

HENRY C. STRUCHEN.